106. COMPOSITIONS, COATING OR PLASTIC.
75
Patented July 30, 1940

Cross Reference

Examiner 2,209,679

UNITED STATES PATENT OFFICE 2,209,679

METHOD OF MANUFACTURING MOLDED BODIES

Albert A. Fowler, North Hollywood, and Russell M. Otis, Pasadena, Calif.

No Drawing. Application December 18, 1936, Serial No. 116,643

4 Claims. (Cl. 18—47.5)

This invention relates to the methods of manufacture of molded bodies in which the molded bodies are formed of light-weight particles of spumiform structure which are bonded together.

In our patent, No. 2,038,034, we disclosed a material composed of a solidified silicate having a spumiform structure, that is, a bubbled or intumesced solidified material having a structure similar to that of foam. Among others, a granular form of this material was disclosed. In an application, Ser. No. 116,644, filed by us concurrently with the present application, we disclosed a glass-like material of spumiform structure including in its composition alkaline oxide, boric acid, and silicon dioxide, which was also adaptable to a granular form. In another application, Ser. No. 116,642, filed by us concurrently with the present application, we disclosed a light-weight glass-like material of spumiform structure of composition having included, with a pitchy water-repellent substance, an intumescent material which was stated in one composition to be alkaline silicate; in another, sodium tetraborate; and in another, alkaline oxide, boric oxide, and silicon dioxide. These spumiform materials were also disclosed in granular form.

An object of this invention is, by bonding together spumiform materials similar to those above-mentioned, to provide a light-weight molded body which is possessed of good heat insulating properties. Another object of our invention is to provide a light molded body which is water-repellent. Still another object is to provide efficient methods of making these molded bodies.

The granular or pulverulent spumiform material which is employed as the base material in the molded bodies which are the subject of this application are exceedingly light in weight, from .9 to 1.5 lbs. per cubic foot in density, and the individual particles of the granular material are very fragile for the essential characteristic of the material is that particles thereof consist of one or more hollow cells with very thin shells. It wil be obvious therefore, that this material cannot be successfully mixed with bonding substances like asphalt in the same way that rock or similar strong material is mixed. A wholly different technique must be employed from that used in bonding other types of granular material. This is further emphasized by the fact that our finished molded bodies herein described generally weigh as little as from 1.5 to 8 lbs. per cu. ft.

A preferred form of molded body employs granular spumiform material in which a pitchy substance such as asphalt is distributed uniformly throughout each granule and exists on the exteriors of the granules. The method of making such a spumiform material is set forth in detail in our copending application above referred to. Briefly, in the making of this granular spumiform material a thick water solution is formed of an intumescent material such as alkaline silicate, or sodium tetraborate, or a composition of alkaline oxide, boric oxide, and silicon dioxide, and to this thick solution is preferably added a pitchy substance, such as asphalt and mixed therein while being heated. This composition is partially desiccated by heat to a degree that when cold it is a hydrous solid. This solid is preferably comminuted into particles of small size which are then rapidly heated to cause intumescence within. In this intumescing stage the granules expand many times and form a light-weight, water-repellent granular spumiform material with pitch through and through. In making this type of material for use in molded bodies as herein described, we prefer to employ, as pitch, an asphalt of high penetration (100–250), and use the asphalt in the proportion of 11 to 25 parts by weight of asphalt to 100 parts of the other intumescent material (solid content). We may employ either natural or artificial asphalts, and of artificial asphalts, either steam refined or air blown, or that made by any other process, or we may employ asphalt in the form of a water emulsion. We may also employ other pitches such as coal tar pitch, and pitch derived from either animal or vegetable matter, and in our use of the word pitch herein we use it in its broad sense and intend to include suitable waxes and all such equivalent substances.

When granular spumiform material of this kind containing asphalt is poured, while hot, into an insulation compartment and gently compressed, it will be found that the particles stick together by reason of the asphalt on their exterior surfaces, and form upon solidification of the asphalt in cooling a semi-solid structure which, while it has very little strength, is sufficiently strong to absolutely prevent settling of the particles in the compartment. By this method we produce a very excellent molded body of heat insulation which is permanently free from settling, and is very light in weight, and consequently has high insulating value. The density of such a molded body may be as low as 1.1 lbs. per cu. ft. The most desirable procedure in forming such a molded body is to pour the intumesced granules directly from the intumescing device, where they have been heated, into the compartment to be filled. In this molded body the asphalt binder is present in an amount far less than that required to fill the voids between the granules, thus making a body with a high percentage of voids and therefore a good insulator of heat.

We may also bond together the granules of spumiform material which do not have pitch as one of their body ingredients. Such solidified intumescent materials, as alkaline silicate; sodium tetraborate; or a composition of alkaline oxide, boric oxide, and silicon dioxide, having a spumiform structure, are described in detail together with methods for their manufacture in either our issued patent or our copending application above referred to. Briefly, they are made in about the same way as the material containing pitch except that pitch is not added in their manufacture. In bonding together such granular materials, pitch is introduced in a finely divided form into a body of the hot spumiform particles preferably by spraying hot asphalt or coal tar of high penetration (100 or 250), or a thin solution of pitch in carbon tetrachloride or other suitable solvent, or an emulsion of pitch in water, and the batch is tumbled to assure uniform distribution of the molten asphalt. If such a solution or emulsion is employed, the carbon tetrachloride or the water readily evaporates leaving a thin coating of pitch on all the granules. Alternatively, the pitch may be added to the body of hot spumiform granules in the form of a fine powder where the pitch employed has a sufficiently high melting point to permit of finely dividing it. In any case, the body of hot pitch coated spumiform granules is then poured into the insulation compartment to be filled and allowed to cool, whereupon the pitch solidifies and binds all the particles together into a molded body of heat insulation as heretofore described. We furthermore find it advantageous to spray asphalt or apply pitch in one of the above described forms to the exteriors of spumiform granules which also have pitch uniformly distributed throughout each granule and which would normally bond without additional pitch. This is because a given quantity of pitch is more effective in bonding if added to the exteriors of the granules on account of less being evaporated during the desiccating and intumescing steps and also because of the fact that the pitch is on the exteriors of the particles where it is all available for bonding. By this additional coating of the exteriors of the granules, then, a stronger bond is provided by use of very little more pitch. Naturally the granules having pitch through and through are preferred because they provide a more water-repellent structure.

We may employ an extension of the above-described methods in making molded bodies having considerable strength. Spumiform granules of any intumescent composition, and made by any of the methods, heretofore mentioned and having pitch on their exteriors available for bonding are, while hot, compressed into a molding form of desired shape. When the compressed body cools, the plastic pitch solidifies, acting as a binder for the spumiform particles, and making a solidly bonded body which, however, retains in some measure the desirable flexible qualities of pitch. The compressing operation may be done by means of a press with pistons forcing the spumiform material into the mold, or by rolling it in; but it is preferably performed by first pressing the material into the form and then, when the shape of the form permits, rolling the surface. This whole operation is preferably done under conditions which maintain the block of molded material hot. Compression of the material is essential in securing a strong well-bonded body that is intended to be removed from the form and to withstand handling. The density of the finished molded body is dependent upon the degree of compression but is generally made from 4 to 8 lbs. per cu. ft.

Because when force is applied to any body to bend it, the greatest stress comes on the surface layer, we prefer to provide additional strength in this layer. This is done by providing to the molded body above described essentially a surface coat of pitch. After the solid molded body has been formed it is impregnated by either spraying or dipping in hot asphalt or coal tar pitch until the pitch has penetrated a little way into the interior of the absorptive surface of the molded body and has formed a definite surface shell in which the pitch substantially fills the voids between the bonded particles. Diatomaceous earth, gypsum, or similar substance may advantageously be blown onto this surface where it sticks and helps to make a smooth hard finish when the pitch cools.

An alternative method of bonding together spumiform particles through a bond of pitch is as follows. In the preparation of the spumiform granules, the intumescing step is stopped before all the water has been evaporated from the intumescent material. A partially expanded granular spumiform material results which is able to further expand upon renewed heating. For the purpose of this method we prefer to leave about 4 to 5% water remaining in the partially expanded particles. The intumescent material may be any of those previously mentioned and the granules may have pitch included within them or have pitch applied only on their exterior surfaces as above described. We place a sufficient quantity of these partially expanded granules in a molding form, preferably compressing them in to compactly fill the form. The molding form is then closed loosely so as to confine the solid contents and is subjected to a temperature sufficient to complete the intumescence of the contained hydrous material and to melt the pitch. Generally a temperature of about 650° F. is used and is continued until desiccation of the contained material is complete. The molded body is allowed to cool in the form and is then removed therefrom. It will be found to be a very solid, strongly bonded material. This molded material should be distinguished from that which is described in our copending application and which results if granules containing more water are used and if the temperature is carried high enough to cause the softened intumescing granules to break through the surface asphalt layers and unite. The material described in the present application is not united in this manner; it is composed of pitchy granules bonded together by the pitch existing on the surfaces of the granules, and the intumescence of the granules simply provides a convenient method of securing compression of the granules while the heat required for intumescence melts the pitch on the granule exteriors and permits the granules to be stuck together. The continued heating of the molded body then results in vaporization of the more volatile pitch components leaving a hard, strong pitch to serve as a bond.

An alternative method is to compress into a form a body of completely expanded spumiform granules of any of the compositions, and made by any of the methods aforementioned, and which have pitch on their exteriors, or a mixture of such granules and finely divided solid pitch of a high melting point. In any case, the form and contents are heated to melt the pitch and cause it to distribute over the immediately near granule surfaces and to bond adjacent granules together. Upon continued heating, the more volatile components of the pitch are vaporized and escape, leaving a hard, strong, very high melting point pitch as a bond.

In the bonding processes above-described, except the last, the action has included the step of solidifying a non-solid binder by cooling it. In the method last described, another way of solidifying entered in, namely, solidification of a non-solid binder by evaporation of the volatile constituents. We will now describe other examples of this type of solidification by evaporation to effect bonding of our spumiform granules.

Granular spumiform material is made as above described, using as intumescent substance either alkaline silicate alone, or sodium tetraborate alone, or the composition containing alkaline oxide, boric oxide, and silicon dioxide, or any of these materials together with pitch as above described. This granular spumiform material is mixed with a non-solid binder, compressed into a molding form of the desired shape and dried, either in or out of the form, until the binder has solidified. A very satisfactory binder consists of a mixture of 10 pounds of a 4% water solution of sodium algenate with ½ pound of a 55% emulsion of asphalt in water. The asphalt emulsion is preferably a very stable one that can withstand the extreme dilution required. Instead of sodium algenate in the formula, any water soluble algenate may be substituted.

28 ounces of this binder is used to every pound of the spumiform particles. The spumiform material and the binder are mixed together and mixing is continued until substantially all the particles are coated with the binder. The moist mixture is then compressed into a form, and when the shape permits, additional material is rolled into the surface. Inasmuch as the granular material weighs only .9 to 1.5 pounds per cubic foot and it is ordinarily desired to produce a block weighing 6 to 8 pounds per cubic foot, it will be noted that a considerable compression is required in this operation. During compression, many of the granules which are composites of several bubbles are broken down into smaller units while still retaining their bubbled shape.

The compressed moist block is, whenever possible, given a surface spray coat of the same solution which is employed as binder. It is then fired to dry and solidify the binder. In firing, it is not necessary to have the block entirely enclosed; for example, a block as thin as one inch is after compression sufficiently strong to be handled and go through the drier on edge with the large flat sides of the form removed and only a rim around the thin edge of the block to protect it. Thus the maximum surface area of the block is exposed and drying is very rapid. The temperature at which drying is conducted is preferably 500° F., and at this temperature a one inch thick block dries in about 1½ hours.

Other bonding solutions may be employed. For example, an algenate without the addition of asphalt emulsion makes a good bond. 26 ounces of a 4% solution of sodium algenate is mixed with 1 pound of spumiform granules. The drying operation is the same as when asphalt is present.

Solutions of gums may also be used as binders. 22 ounces of a 2 to 4% water solution of gum arabic may be employed to bond 1 pound of spumiform granules. With this binder, drying is done at 350° F. and a one inch thick block dries in about 1 hour.

These insulating blocks made by bonding together spumiform granules by one of the binders and in the manner just described may be made strong enough to handle, saw, and nail through and yet weigh only 6 to 8 pounds per cubic foot. When made with a binder of algenate and asphalt emulsion they are suitable for continued use at temperatures up to 800° F.

In all the molded bodies described herein, we prefer to employ binder in an amount less than that sufficient to fill the voids between the spumiform particles being bonded, except in surface layers as previously indicated; and in this manner we secure very light efficient insulating bodies.

It is desirable to call attention to the notable advantages from the standpoint of heat insulation of the internal structure of the molded bodies made by bonding together spumiform granules of the character of those employed in our invention. These granules are called spumiform because they are similar in form to little bits of solidified foam. Some are so small that they consist of only a single bubble just as a piece of foam small enough will consist of a single bubble. This bubbled character, accompanied by thin bubble walls, is what we mean to indicate when we apply the term spumiform to all the particles whether they consist of one hollow bubble or many bubbles joined. The thin walls, which are generally of much less thickness than the enclosed bubble spaces, permit deflection under pressure and thus cause a body of the spumiform granules to be compressible and resilient.

The problem of heat insulation is essentially one of forming the greatest number of closed air cells of the smallest volume per cell, while using the minimum amount of solid material in the cell walls. It is well known that a sphere requires the minimum amount of surface area to enclose a given volume and the contact surface between spheres is smaller than for any other shape. Thus a block built up by bonding hollow cells having spherical enclosing surfaces is capable of a greater insulating value or lower conductivity than a body made by using cells of any other shape. Because of the bubbled character of our spumiform granules, therefore, they are best suited to be bonded together to form a light, strong block of maximum insulation value, and the tested efficiency of the molded bodies described herein amply confirms this analysis.

In using the term "intumescent substance" herein, we mean to describe a substance of the class of those disclosed which under proper circumstances is capable of intumescence, but do not mean to imply that an intumescent substance is always capable of intumescence; for a solidified intumescent substance which is completely desiccated, or anhydrous, can no longer intumesce.

It is to be understood that various changes and modifications in the details of compositions and manufacture of the products represented in our invention may be made by those skilled in the art without departing from the spirit and scope of the invention as defined in the appended claims.

We claim:

1. The method of making a molded body which comprises confining, in a molding form, a body of hydrous spumiform granules of an intumescent material containing pitch on their exterior surfaces, and heating the form and contents to melt said pitch and to cause said granules to further intumesce and press tightly together, in such manner that they become bonded through the pitch on their exterior surfaces.

2. The method of making a molded body which includes the steps of forming a uniform mixture of pitch in a hydrous solution of an intumescent substance, partially desiccating said mixture to form a solid containing water, comminuting said solid, heating said comminuted material to form intumescent spumiform particles retaining a small amount of water and having pitch on their exterior surfaces, compressing into a molding form a body of said spumiform particles, and heating the form and contents to melt the pitch on their exterior surfaces and to cause said particles to further intumesce and press tightly together, in such manner that they become bonded through the surface layers of pitch.

3. The method of making a molded body which comprises introducing pitch in a finely divided form into a body of spumiform granules of a solidified composition containing alkaline oxide, boric oxide, and silicon dioxide, the pitch being of an amount less than that required to fill the voids between the granules, compressing said body of granules while hot, and solidifying said pitch.

4. The method of making a molded body which includes confining, in a molding form, a body of hydrous spumiform granules of a solidified composition containing alkaline oxide, boric oxide, and silicon dioxide, said granules including pitch on their exterior surfaces, and heating the form and contents to melt said pitch and to cause said granules to further intumesce and press tightly together, in such manner that they become bonded through the pitch on their exterior surfaces.

ALBERT A. FOWLER.
RUSSELL M. OTIS.